(12) United States Patent
Lin et al.

(10) Patent No.: US 12,334,682 B2
(45) Date of Patent: Jun. 17, 2025

(54) MECHANICAL LOCK AND CHARGING CONNECTOR WITH IMPROVED LOCKING FEATURES

(71) Applicant: LUXSHARE PRECISION INDUSTRY (JIANGSU)CO.,LTD., Jiangsu (CN)

(72) Inventors: Peiwei Lin, Shanghai (CN); Peiquan Lin, Shanghai (CN); Xingran Tang, Shanghai (CN); Yunbo Linghu, Shanghai (CN)

(73) Assignee: LUXSHARE PRECISION INDUSTRY (JIANGSU) CO., LTD., Jiangsu (CN)

( * ) Notice: Subject to any disclaimer, the term of this patent is extended or adjusted under 35 U.S.C. 154(b) by 410 days.

(21) Appl. No.: 18/095,212

(22) Filed: Jan. 10, 2023

(65) Prior Publication Data

US 2024/0195123 A1    Jun. 13, 2024

(30) Foreign Application Priority Data

Dec. 13, 2022 (CN) .......................... 202211593993.9

(51) Int. Cl.
| | |
|---|---|
| *H01R 13/639* | (2006.01) |
| *B60L 53/16* | (2019.01) |
| *H01R 13/627* | (2006.01) |
| *H01R 13/70* | (2006.01) |

(52) U.S. Cl.
CPC ............ *H01R 13/639* (2013.01); *B60L 53/16* (2019.02); *H01R 13/701* (2013.01); *H01R 13/6275* (2013.01); *H01R 2201/26* (2013.01)

(58) Field of Classification Search
CPC ................ H01R 13/639; H01R 13/701; H01R 13/6275; H01R 2201/26; B60L 53/16
USPC ........................................................ 439/304
See application file for complete search history.

(56) References Cited

U.S. PATENT DOCUMENTS

| | | | | |
|---|---|---|---|---|
| 6,033,244 | A | * | 3/2000 | Nishioka ............ G06K 13/0806 439/159 |
| 6,039,587 | A | * | 3/2000 | Oguchi ................ G06K 13/085 439/159 |
| 6,042,401 | A | * | 3/2000 | Oguchi .............. G06K 13/0806 439/159 |

(Continued)

FOREIGN PATENT DOCUMENTS

| | | |
|---|---|---|
| CN | 215343207 U | 12/2021 |
| CN | 115173130 A | 10/2022 |
| TW | M548897 U | 9/2017 |

*Primary Examiner* — Gary F Paumen
(74) *Attorney, Agent, or Firm* — Birch, Stewart, Kolasch & Birch, LLP

(57) ABSTRACT

A mechanical lock is used for a charging connector. The charging connector includes a housing and a hook. The hook has an engaging portion and an operating portion. The mechanical lock includes a push rod, a swing lever and a first elastic member. The push rod is slidably arranged on the housing along a first direction. The push rod has a heart-shaped cam and a heart-shaped groove. The heart-shaped groove has an unlocking position and a locking position. When an end of the swing lever is located at the locking position, the operating portion is locked by the push rod, and the operating portion cannot move. When the end of the swing lever is located at the unlocking position, the push rod unlocks the operating portion, and the operating portion is movable.

20 Claims, 26 Drawing Sheets

(56) References Cited

U.S. PATENT DOCUMENTS

| | | | | |
|---|---|---|---|---|
| 6,142,801 A | * | 11/2000 | Koseki | H01R 13/633 439/159 |
| 6,908,322 B1 | * | 6/2005 | Bricaud | G06K 7/0021 439/152 |
| 7,341,466 B1 | * | 3/2008 | Kondo | H01R 13/641 439/159 |
| 8,902,602 B2 | | 12/2014 | Wang | |
| 2005/0193402 A1 | * | 9/2005 | Shiu | G11B 17/056 720/636 |

* cited by examiner

MECHANICAL LOCK AND CHARGING CONNECTOR WITH IMPROVED LOCKING FEATURES

CROSS-REFERENCE TO RELATED APPLICATION

This patent application claims priority of a Chinese Patent Application No. 202211593993.9, filed on Dec. 13, 2022 and titled "MECHANICAL LOCK AND CHARGING CONNECTOR", the entire content of which is incorporated herein by reference.

TECHNICAL FIELD

The present disclosure relates to a mechanical lock and a charging connector, which belongs to a technical field of charging devices for electric vehicles.

BACKGROUND

In the related art, a charging connector (i.e., a charging gun electrically connected to a charging pile) of an electric vehicle usually includes a hook. The hook is usually configured such that one end is an engaging portion and another end is an operating portion. A middle portion of the hook is pivotally supported on a housing of the charging connector. When an external force is applied to the above-mentioned operating portion, the engaging portion of the hook will tilt up, so as to be conveniently snapped into and out of a groove of a mating connector (i.e., a charging mating portion on the electric vehicle).

In order to avoid the load disconnection of the charging connector, during the charging process, the above-mentioned operating portion needs to be locked and be in a state where it will not move even when an external force is applied. In the related art, a motor electronic lock is often used to lock the hook. However, the motor electronic lock is not well adapted to harsh environments, and is prone to abnormalities and insufficient reliability.

SUMMARY

An object of the present disclosure is to provide a reliable mechanical lock with improved adaptability to harsh environments, and a charging connector having the mechanical lock.

In order to achieve the above object, the present disclosure adopts the following technical solution: a mechanical lock configured to be used in a charging connector; the charging connector comprising a housing and a hook; the hook comprising an engaging portion and an operating portion; the engaging portion being engaged or disengaged with a mating connector when the operating portion is moved by an external force; the mechanical lock comprising a push rod, a swing lever and a first elastic member; wherein the first elastic member is configured to be able to provide the push rod with a force opposite to a direction of the external force which is applied to the push rod; the push rod is slidably arranged on the housing along a first direction; the push rod has a heart-shaped cam and a heart-shaped groove; the heart-shaped groove surrounds a peripheral of the heart-shaped cam; one end of the swing lever is fixed to the housing, and another end of the swing lever is located in the heart-shaped groove; the heart-shaped groove has an unlocking position and a locking position; when the another end of the swing lever is located at the locking position, the operating portion is locked by the push rod, and the operating portion cannot move; and when the another end of the swing lever is located at the unlocking position, the push rod unlocks the operating portion, and the operating portion is movable.

In order to achieve the above object, the present disclosure adopts the following technical solution: a charging connector, comprising: a housing, a hook and a mechanical lock; wherein the hook comprises an engaging portion and an operating portion; the engaging portion is engaged or disengaged with a mating connector when the operating portion is moved by an external force; the mechanical lock is configured to lock or unlock the operating portion, so that the operating portion is in a movable state or an immovable state; the mechanical lock comprises: a push rod, a swing lever and a first elastic member; the first elastic member is configured to be able to provide the push rod with a force opposite to a direction of the external force which is applied to the push rod; the push rod is slidably arranged on the housing along a first direction; the push rod has a heart-shaped cam and a heart-shaped groove; the heart-shaped groove surrounds a peripheral of the heart-shaped cam; one end of the swing lever is fixed to the housing, and another end of the swing lever is located in the heart-shaped groove; the heart-shaped groove has an unlocking position and a locking position; when the another end of the swing lever is located at the locking position, the operating portion is locked by the push rod, and the operating portion cannot move; and when the another end of the swing lever is located at the unlocking position, the push rod unlocks the operating portion, and the operating portion is movable.

Compared with related technologies, the present disclosure has the following advantages: the mechanical lock adopts a purely mechanical structure, which is more reliable in use. As a result, the reliability of the charging connector having the mechanical lock is improved accordingly.

DETAILED DESCRIPTION

Figure 1:
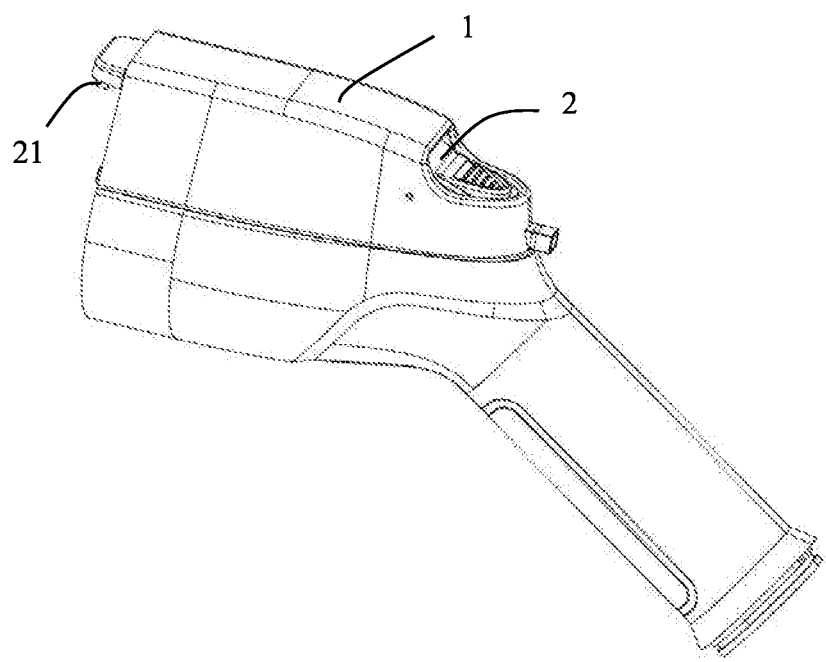
FIG. 1 is a schematic view of an overall structure of a charging connector in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

In the drawings, a direction A1 is a first direction. An arrow of the direction A1 points to a positive direction of A1, which is a front direction; and vice versa, a negative direction of A1, which is a rear direction. A direction A2 is a left-right direction. An arrow of the direction A2 points to a positive direction of A2, which is a right direction; and vice versa, a negative direction of A2, which is a left direction. An arrow of a direction A3 points to a positive direction of A3, which is a top direction; and vice versa, a negative direction of A3, which is a bottom direction.

This present disclosure discloses a mechanical lock 3 and a charging connector 100 using the mechanical lock 3. The charging connector 100 is often referred to as a charging gun in the art. The specific embodiments of the mechanical lock 3 and the charging connector 100 having the mechanical lock 3 will be introduced respectively below with reference to the accompanying drawings.

For the convenience of understanding of the present disclosure, some features of the charging connector 100 disclosed in the present disclosure will first be described as follows.

Figure 2:
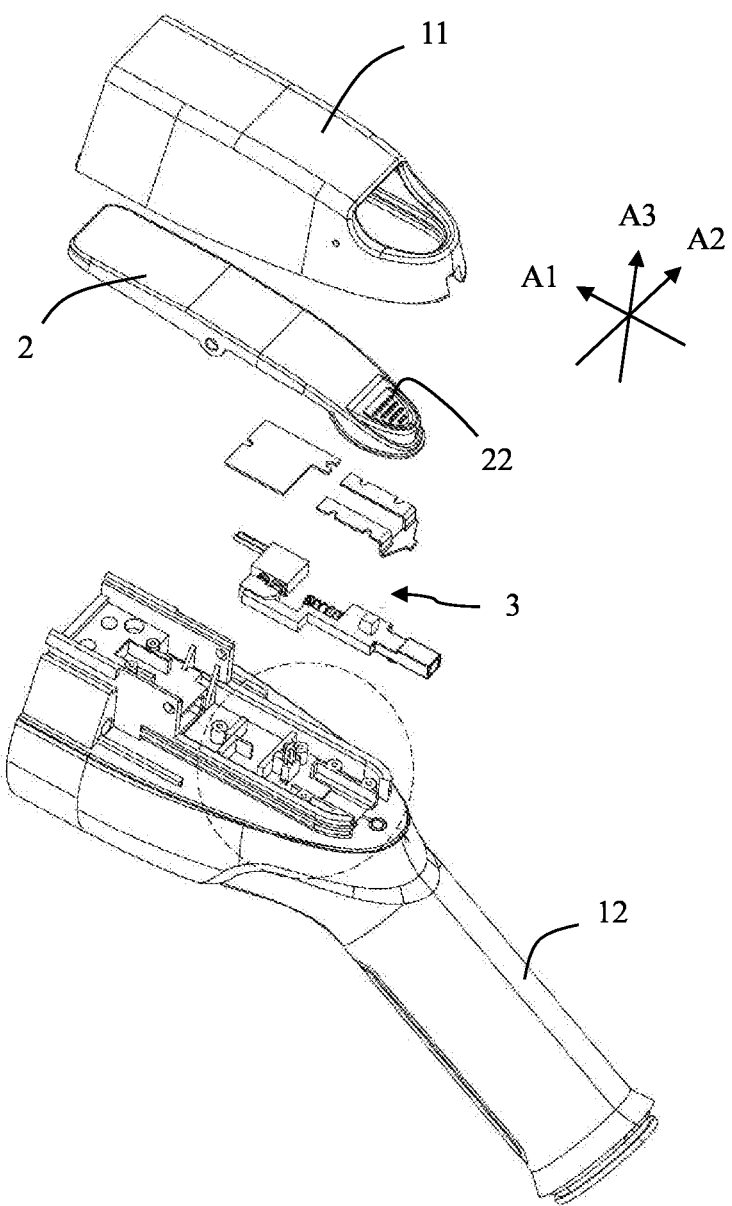
FIG. 2 is an exploded schematic view of an embodiment of the charging connector of the present disclosure.
Figure 24:
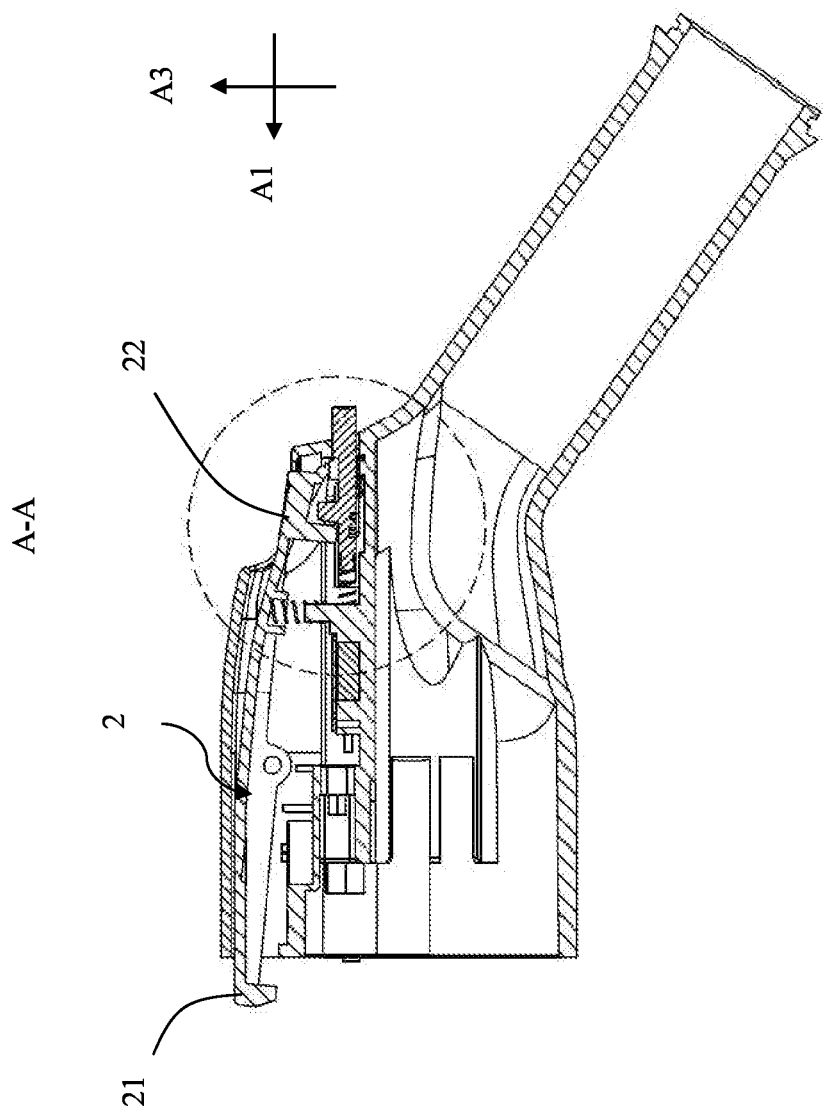
FIG. 24 is a sectional view taken along line A-A of FIG. 23.

Referring to FIGS. 1, 2 and 24, the charging connector 100 includes a housing 1, a hook 2 and a mechanical lock 3. The hook 2 is pivotally disposed on the housing 1. One end of the hook 2 is an engaging portion 21, and another end is an operating portion 22. When the operating portion 22 is pressed by an external force, the engaging portion 21 will tilt up so as to snap into or out of a slot of a mating connector (not shown). The mechanical lock 3 is used to lock and unlock the operating portion 22 of the hook 2, so that it is in an operable state or inoperable state.

Mainly referring to FIGS. 4 to 19, the mechanical lock 3 mainly includes a push rod 31, a swing lever 32 and a first elastic member 33. In the illustrated embodiment, the first elastic member is a spring.

Figure 7:
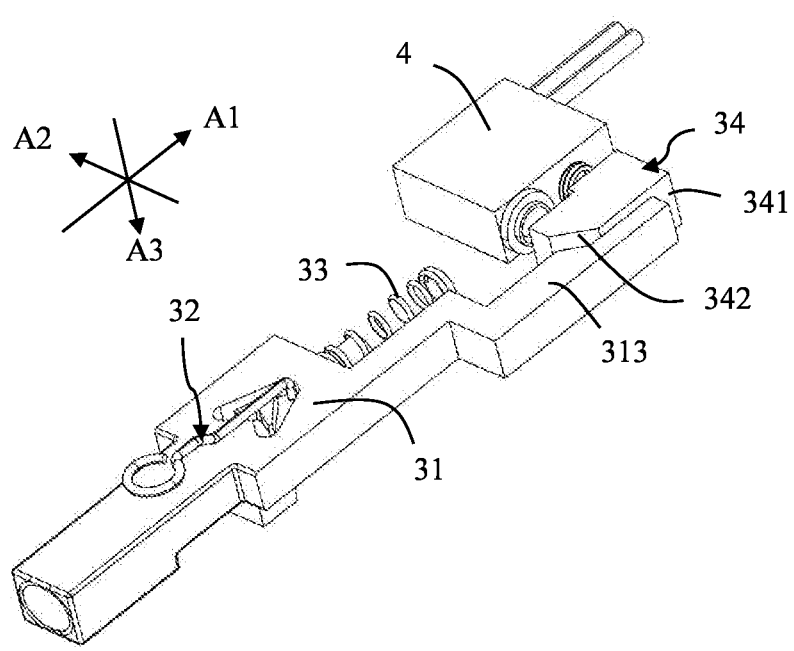
FIG. 7 is a structural schematic view of the mechanical lock at another angle in accordance with the embodiment of the present disclosure (the switch is also shown)
Figure 8:
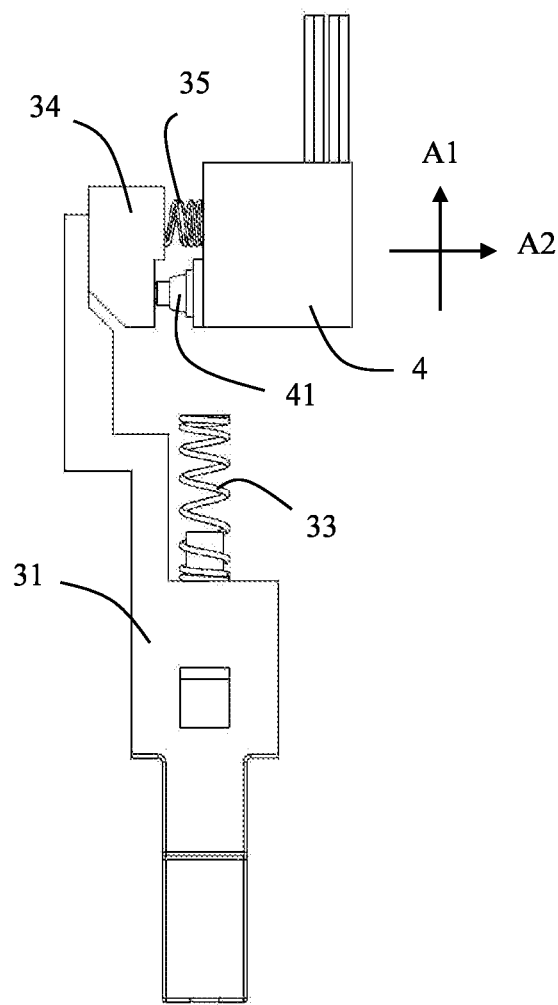
FIG. 8 is a schematic top view of the mechanical lock when a swing lever is in an unlocked position (the switch is also shown)
Figure 17:
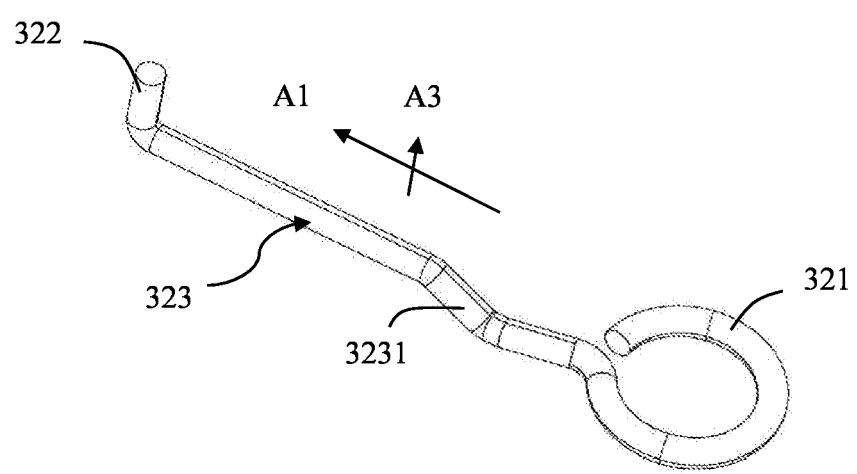
FIG. 17 is a structural schematic view of the swing lever.

Referring to FIGS. 7 and 17, swing lever 32 includes annular handle 321, a hook portion 322, and a rod 323 extending between the annular handle 321 and the hook portion 322.

The annular handle 321 is fixed on the housing 1 of the charging connector 100. The rod 323 extends in the direction A1. An extending direction of the hook portion 322 is substantially perpendicular to an extending direction of the rod 323. The hook portion 322 is located in a heart-shaped groove 3114 which will be described below in detail.

In the illustrated embodiment, the rod 323 has a bent section 3231 extending upwardly and forwardly (i.e., along the positive direction of A3 and the positive direction of A1). This makes there be more space under the hook portion 322, thereby facilitating the movement of the hook portion 322 in the top-bottom direction.

Figure 4:
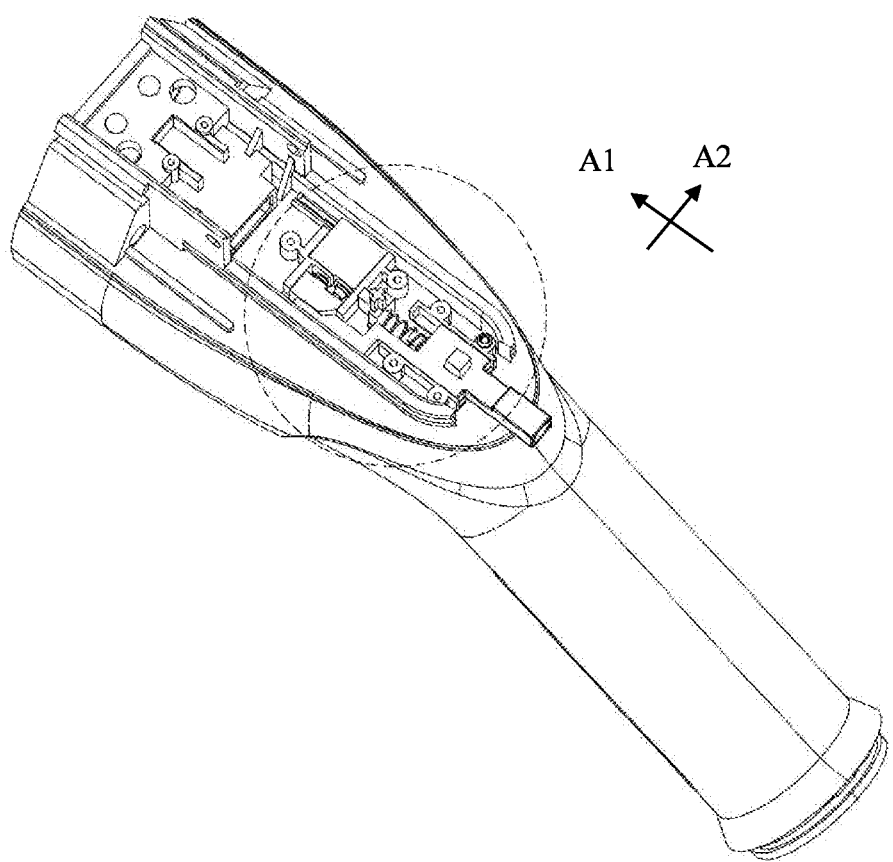
FIG. 4 is a partial structural schematic view of an embodiment of the charging connector of the present disclosure.
Figure 16:
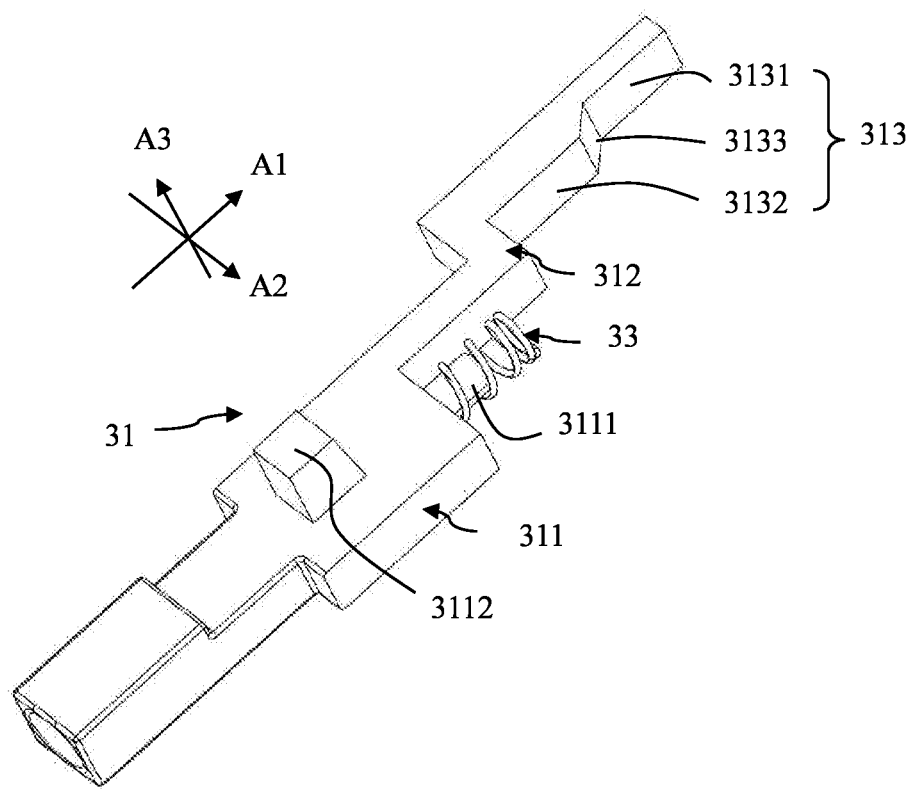
FIG. 16 is a schematic structural view of a push rod (a first elastic member is also shown)
Figure 18:
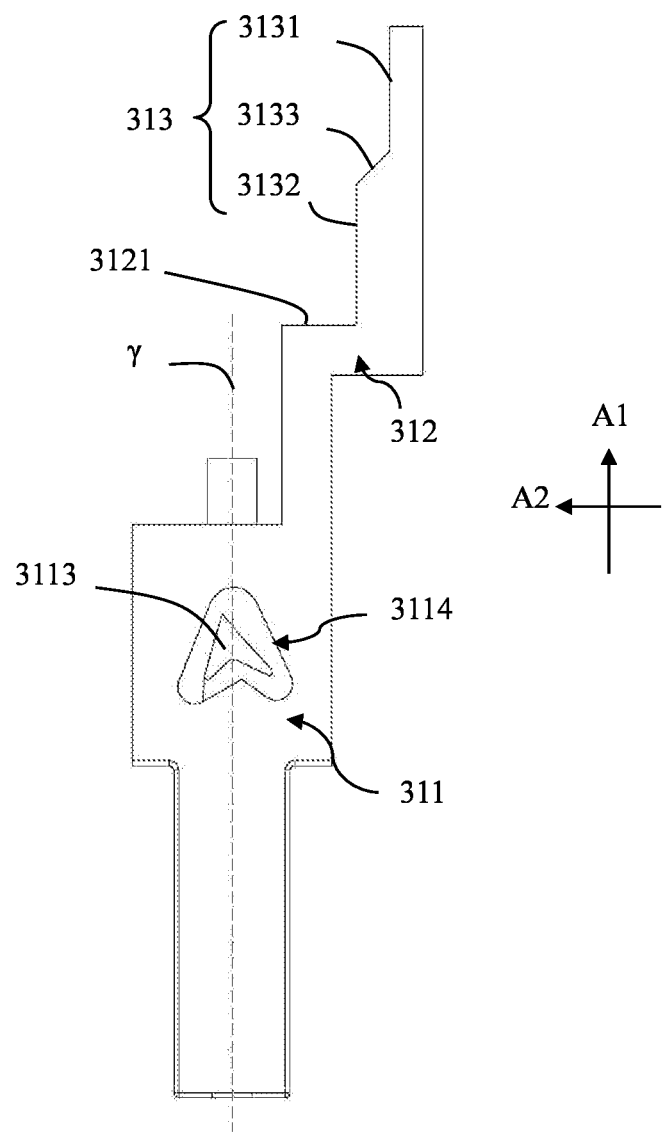
FIG. 18 is a schematic bottom view of the push rod.

Referring to FIGS. 4, 16 and 18, the push rod 31 is slidably disposed on the housing 1 along the direction A1. The push rod 31 includes a push rod body 311, a bent portion 312 and a switch linkage portion 313.

Viewed along the direction A1, one end of the push rod body 311 extends beyond the housing 1 for being pushed by an external force; and the other end of the push rod body 311 has a protruding post 3111. One end of the first elastic member 33 is sleeved on the protruding post 3111; and the other end of the first elastic member 33 abuts against the housing 1. When the push rod 31 moves forwardly along the positive direction of A1 under the external force, the first elastic member 33 provides a backward restoring force to the push rod 31.

An upper side of the push rod body 311 has a locking protrusion 3112. The locking protrusion 3112 protrudes upwardly from the upper side of the push rod body 311.

The push rod body 311 has a heart-shaped cam 3113 and a heart-shaped groove 3114. The heart-shaped groove 3114 surrounds a peripheral of the heart-shaped cam 3113. The heart-shaped groove 3114 is upwardly recessed from a lower side of the push rod body 311.

Figure 19:
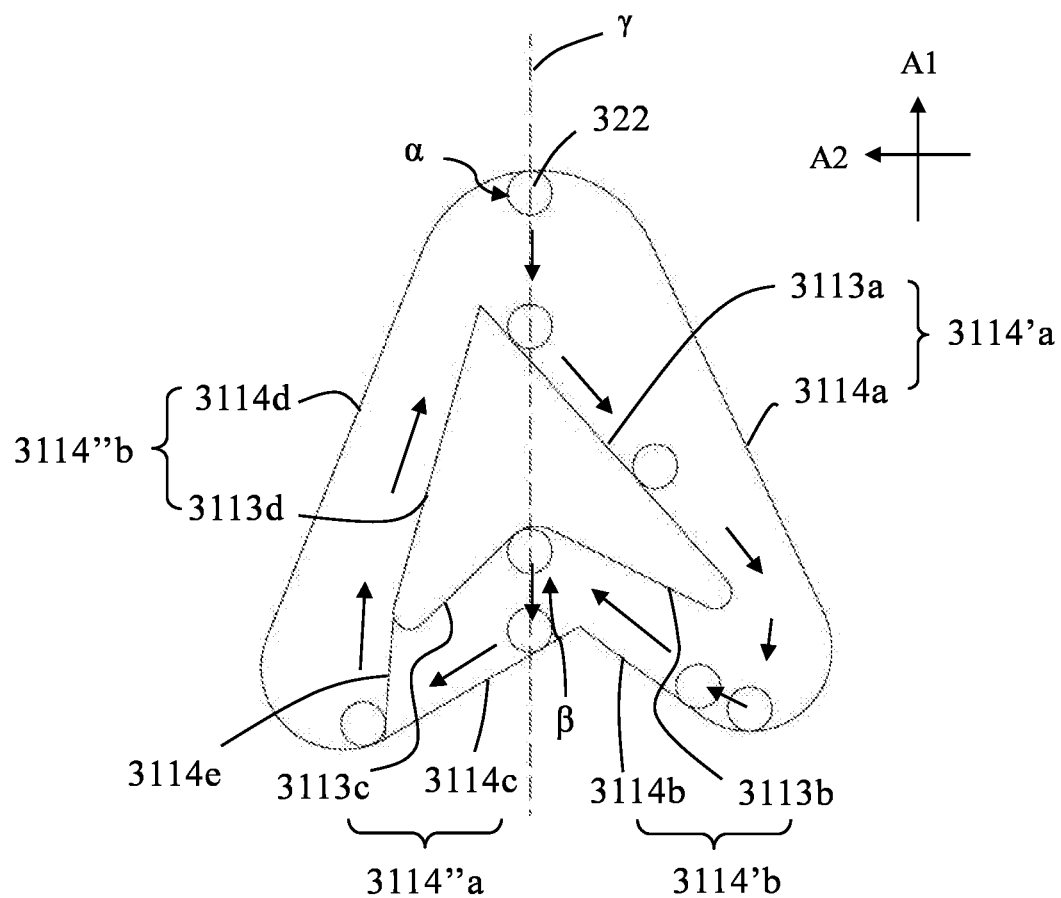
FIG. 19 is a structural schematic view of a heart-shaped cam and a heart-shaped groove.

Referring to FIG. 18 and FIG. 19, a tip of the heart-shaped groove 3114 has an unlocking position α, and a recess of the heart-shaped groove 3114 has a locking position β. The hook portion 322 located in the heart-shaped groove 3114 abuts against a groove bottom of the heart-shaped groove 3114. The hook portion 322 can be guided from the unlocking position α to the locking position β or from the locking position β to the unlocking position α, under the common guidance of the heart-shaped cam 3113 and the heart-shaped groove 3114.

Referring to FIG. 19, the heart-shaped cam 3113 has a first cam surface 3113a, a second cam surface 3113b, a third cam surface 3113c and a fourth cam surface 3113d. The first cam surface 3113a, the second cam surface 3113b, the third cam surface 3113c and the fourth cam surface 3113d are connected end to end in sequence.

The heart-shaped groove 3114 has a first groove wall 3114a, a second groove wall 3114b, a third groove wall 3114c and a fourth groove wall 3114d. The first groove wall 3114a, the second groove wall 3114b, the third groove wall 3114c and the fourth groove wall 3114d are connected end to end in sequence.

The heart-shaped groove 3114 includes a first groove section 3114'a, a second groove section 3114'b, a third groove section 3114"a, and a fourth groove section 3114"b.

The first groove section 3114'a and the second groove section 3114'b form a locking guide slot for locking. The third groove section 3114"a and the fourth groove section 3114"b form an unlocking guide slot for unlocking. A junction of the fourth groove section 3114"b and the first groove section 3114'a is the tip of the heart-shaped groove 3114. A junction of the first groove section 3114'a and the second groove section 3114'b is a first corner of the heart-shaped groove 3114. A junction of the second groove section 3114'b and the third groove section 3114"a is the recess of the heart-shaped groove 3114. A junction of the third groove section 3114"a and the fourth groove section 3114"b is a second corner of the heart-shaped groove 3114.

The first groove section 3114'a is at least surrounded by the first cam surface 3113a and the first groove wall 3114a opposite to each other. The second groove section 3114'b is at least surrounded by the second cam surface 3113b and the second groove wall 3114b opposite to each other. The third groove section 3114"a is at least surrounded by the third cam surface 3113c and the third groove wall 3114c opposite to each other. The fourth groove section 3114"b is at least surrounded by the fourth cam surface 3113d and the fourth groove wall 3114d opposite to each other.

A dotted line γ in FIG. 19 is a line passing through a center of the unlocked position α and a center of the locked position β. In the illustrated embodiment, viewed from an angle shown in FIG. 19, the dotted line γ is also a centerline of the push rod body 311 and a centerline of the rod 323.

Figure 11:
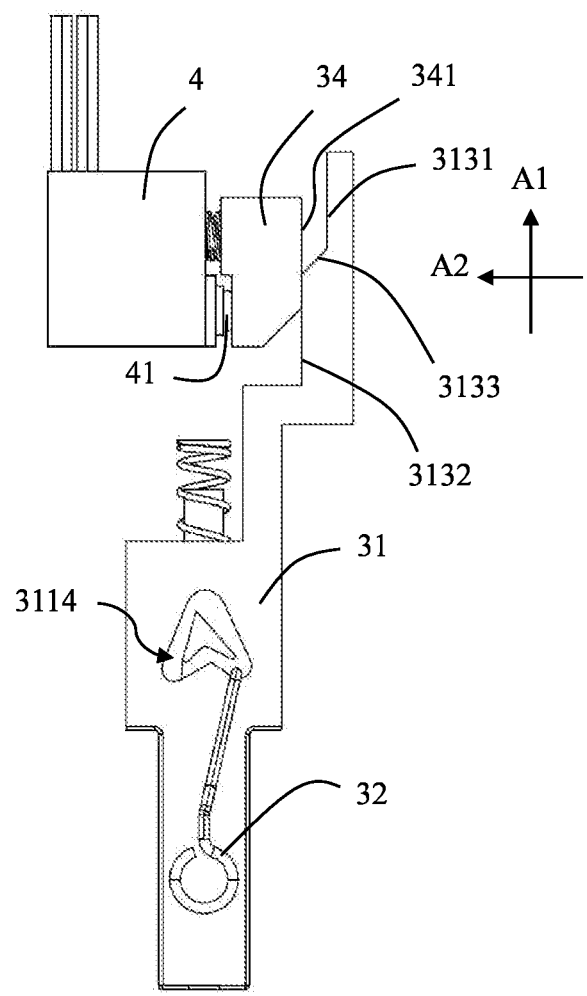
FIG. 11 is a schematic bottom view of the mechanical lock when the swing lever is at the first corner (the switch is also shown)
Figure 12:
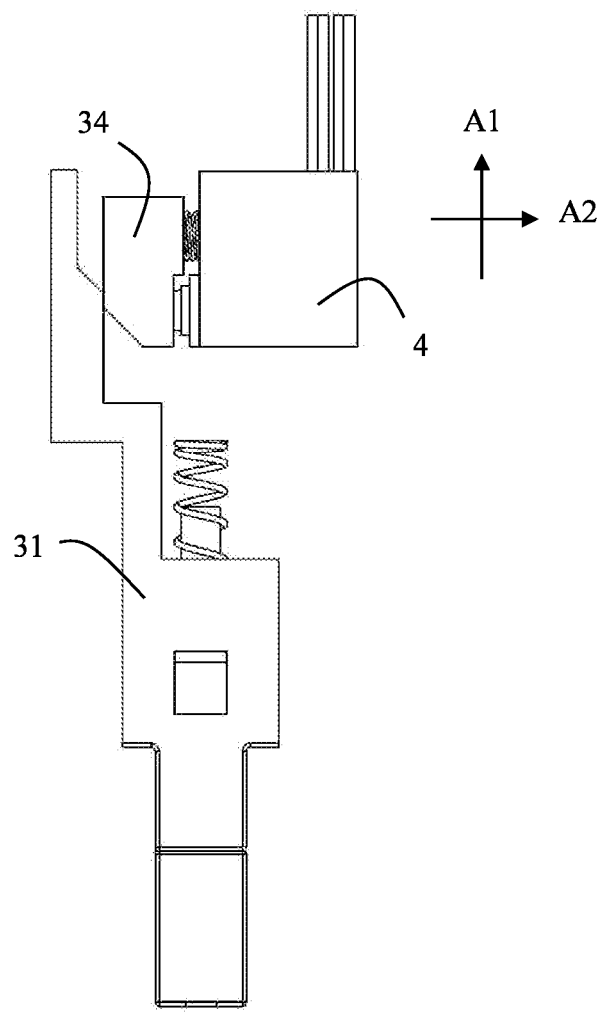
FIG. 12 is a schematic top view of the mechanical lock when the swing lever is in the locked position (the switch is also shown)
Figure 13:
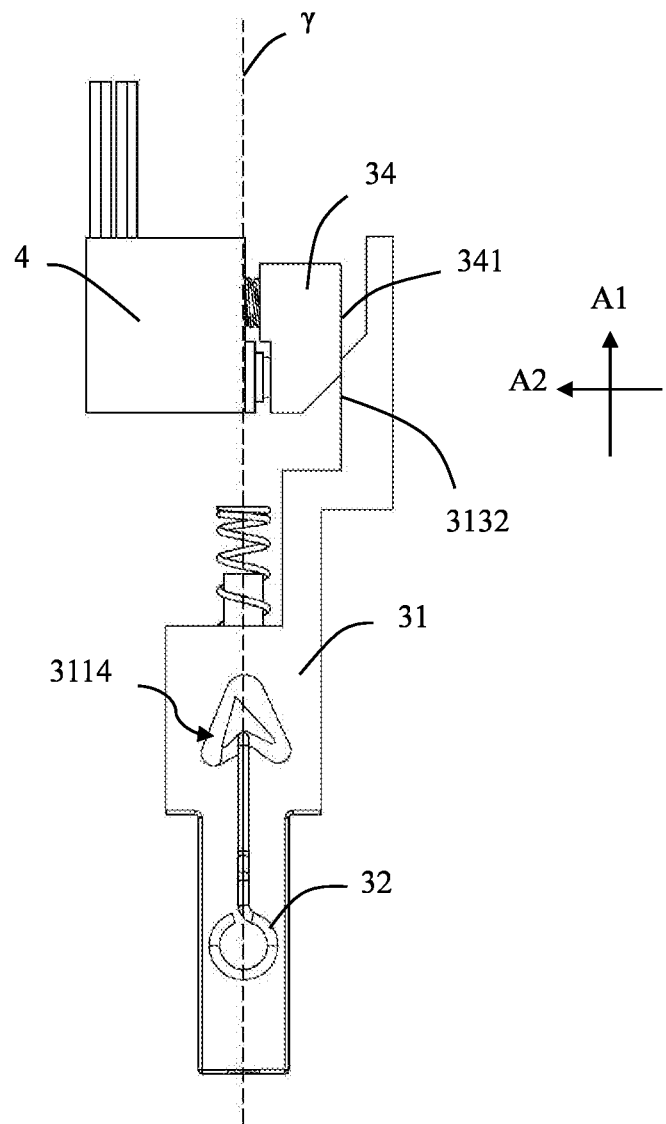
FIG. 13 is a schematic bottom view of the mechanical lock when the swing lever is in the locked position (the switch is also shown)
Figure 14:
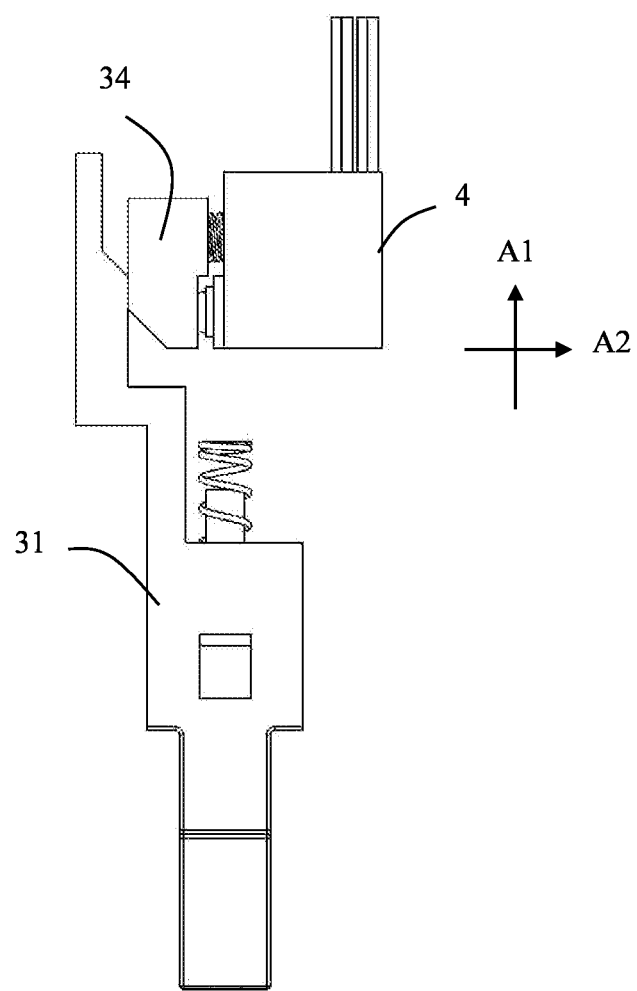
FIG. 14 is a schematic top view of the mechanical lock when the swing lever is at a second corner (the switch is also shown)

As shown in FIG. 19, at an entrance of the first groove section 3114'a, the first cam surface 3113a is located to the right of the dotted line γ. This makes the hook portion 322 correspondingly move to the first cam surface 3113a when the external force pushes the push rod 31 to move forwardly (for example, along the positive direction of A1) for the first time. It should be understandable that in practice, the hook portion 322 does not move in the front-rear direction, it only moves in the left-right direction, and the arrow in the drawings only indicates a relative movement track of the hook portion 322 in the heart-shaped groove 3114. Besides, as the push rod 31 further moves forwardly, the hook portion 322 reaches an exit of the first groove section 3114'a, that is, an entrance of the second groove section 3114'b under the guidance of the first cam surface 3113a. Referring to FIG. 11, at this moment, the rod 323 is deflected to the left. The elastic force of the rod 323 itself will prompt the hook portion 322 to move to the right relative to the push rod 31, that is, to move to the second groove section 3114'b. Continue referring to FIG. 19, when the external force is removed, the elastic force of the first elastic member 33 will push the push rod 31 to move backwardly, and the hook portion 322 will move forwardly relative to the push rod 31. Then, under the action of its own elastic force and the first elastic member 33, the hook portion 322 will move rightward and forward relative to the push rod 31. A track line of the aforementioned rightward and forward compound movement intersects with the second cam surface 3113b. At the intersection and thereafter, the hook portion 322 will move along the second cam surface 3113b until reaching the recess of the heart-shaped groove 3114. It should be understandable that, in some cases, the track line of the aforementioned rightward and forward compound movement may directly intersect with the rightmost side of the second cam surface 3113b. That is to say, the hook portion 322 will directly move to the locking position ß in the second groove section 3114'b without relying on the second cam surface 3113b for guidance. At the recess, the rod 323 is not in a yaw state. There is no restoring force in the left-right direction of the rod 323, and the rod 323 will be located between the second cam surface 3113b and the third cam surface 3113c. One side of the push rod 31 receives the elastic force of the first elastic member 33, and the other side of the push rod 31 receives the resisting force given by the swing lever 32. The elastic force of the first elastic member 33 is in balance with the resisting force of the swing lever 32, so that the push rod 31 and the swing lever 32 reach a balanced state. At this time, the hook portion 322 is located at the locking position β, see FIG. 13. At this time, the locking protrusion 3112 abuts against the operating portion 22 of the hook 2. The operating portion 22 is in a locked state, which cannot be pressed by external force. The engaging portion 21 will not be released from the mating connector.

Figure 15:
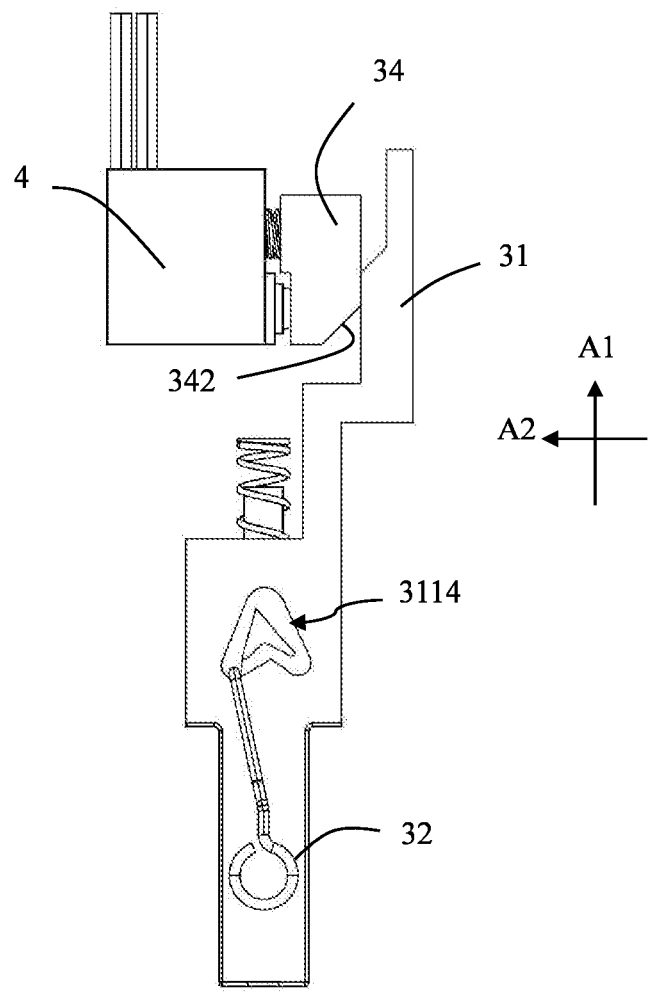
FIG. 15 is a schematic bottom view of the mechanical lock when the swing lever is at the second corner (the switch is also shown)

At an entrance of the third groove section 3114"a, the third groove wall 3114c is located on a left side of the dotted line γ. When the external force pushes the push rod 31 for the second time, the push rod 31 moves forwardly, and the hook portion 322 moves backwardly relative to the push rod 31. At this time, the track line of the movement of the hook portion 322 will intersect with the third groove wall 3114c. After the intersection, the hook portion 322 will enter the fourth groove section 3114"b guided by the third groove wall 3114c, as shown in FIG. 15.

Figure 9:
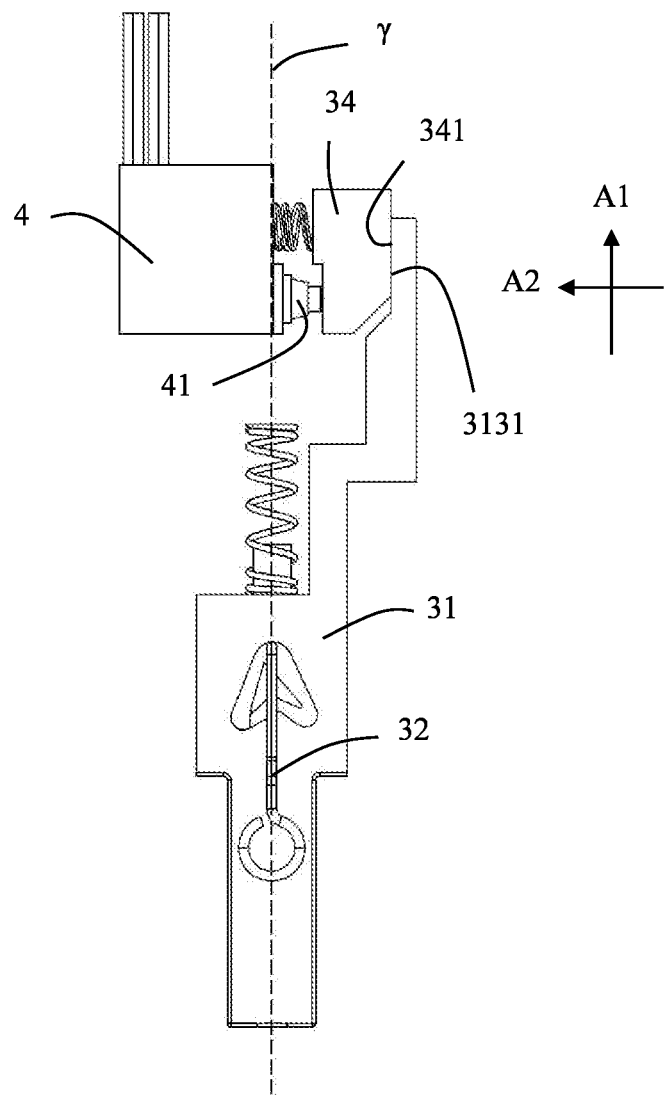
FIG. 9 is a schematic bottom view of the mechanical lock when the swing lever is in the unlocked position (the switch is also shown)
Figure 10:
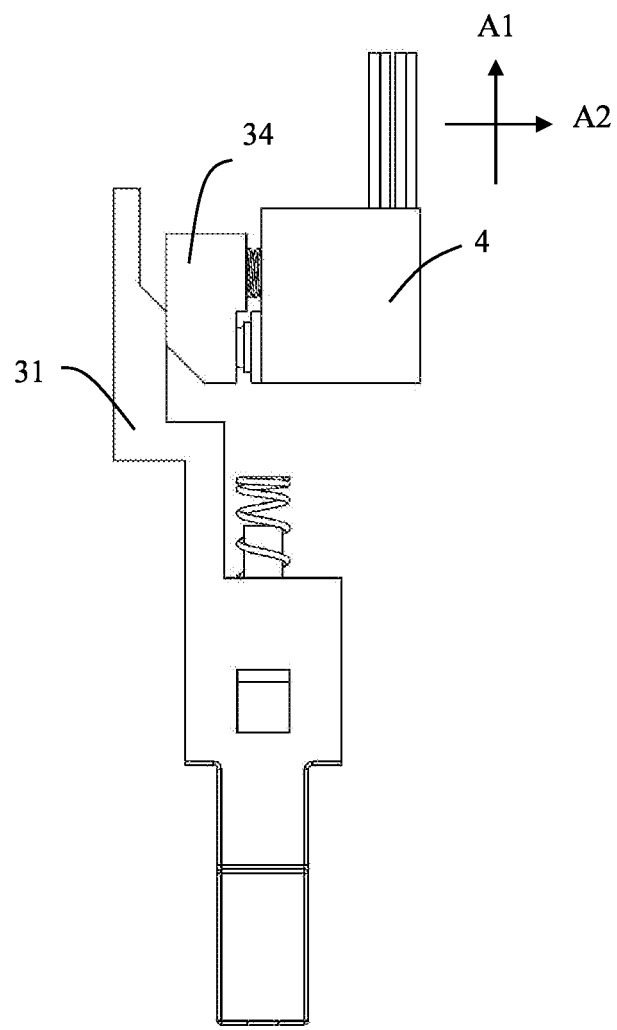
FIG. 10 is a schematic top view of the mechanical lock when the swing lever is at the first corner (the switch is also shown)
Figure 25:
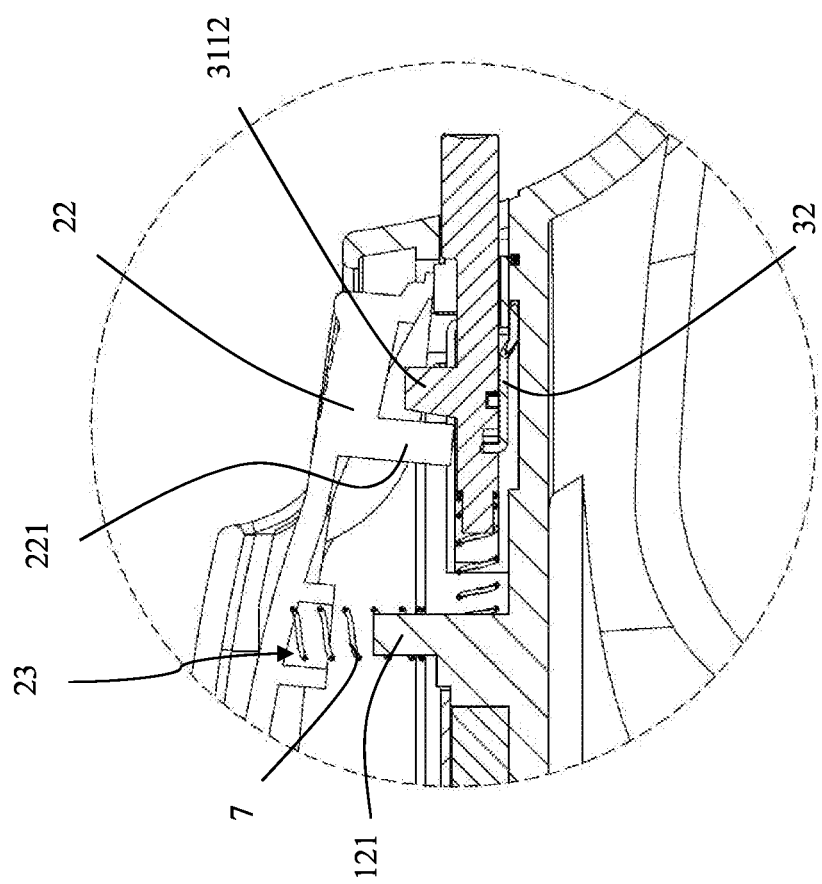
FIG. 25 is a partially enlarged view of FIG. 24.

When the second pressing force is removed, the push rod 31 will move backwardly under the push of the first elastic member 33. In the meanwhile, because the swing lever 32 positioned at the exit of the third groove section 3114"a is deflected to the right, its own elastic force can impel it to move to the left. That is to say, after the force of the second pressing is removed, the swing lever 32 will move leftward and forward relative to the push rod 31 (for example along the negative direction of A2 and the positive direction of A1). In order to better prevent the swing lever 32 from returning reversely to the third groove section 3114"a, a step 3114e is provided at the groove bottom of the heart-shaped groove 3114. The step 3114e is located at the exit of the third groove section 3114"a. The groove bottom of the third groove section 3114"a is shallower than the groove bottom of the fourth groove section 3114"b. After the external force pushes the push rod 31 for the second time, the hook portion 322 moves to the exit of the third groove section 3114"a and moves to another side of the step 3114e, and the step 3114e will prevent the hook portion 322 located in the fourth groove section 3114"b from returning to the third groove section 3114"a. At the same time, the hook portion 322 will move forwardly relative to the push rod 31 under the guidance of the step 3114e. Finally, under the guidance of the fourth cam surface 3113d, the hook portion 322 is located at the unlocking position α again, as shown in FIG. 9. Referring to FIG. 24 and FIG. 25, when the hook portion 322 is at the unlocking position α, the locking projection 3112 staggers away from the operating portion 22 of the hook 2, and the operating portion 22 of the hook 2 can be pressed down to be in an unlocked state.

Viewed along a direction in which the hook portion 322 moves relative to the heart-shaped groove 3114, the groove bottom of the heart-shaped groove 3114 gradually becomes shallower from the entrance of the fourth groove section 3114"b to the exit of the third groove section 3114"a, which is in a shape of a spiral slope. The step 3114e is located at the junction of the entrance of the fourth trough section 3114"b and the exit of the third trough section 3114"a.

Referring to FIG. 18, the switch linkage portion 313 of the push rod 31 has a first working surface 3131, a second working surface 3132, and a first guide surface 3133 extending between the first working surface 3131 and the second working surface 3132. In the illustrated embodiment, the first guide surface 3133 is an inclined surface.

The bent portion 312 of the push rod 31 extends between the push rod body 311 and the switch linkage portion 313, and has a first surface 3121. When the push rod 31 moves forwardly under the external force, the first surface 3121 can be used as a stop surface. That is, when the push rod 31 reaches the maximum forward displacement (that is, when the hook portion 322 is located at the first corner or the second corner), the first surface 3121 approaches or abuts against the housing 1.

Figure 5:
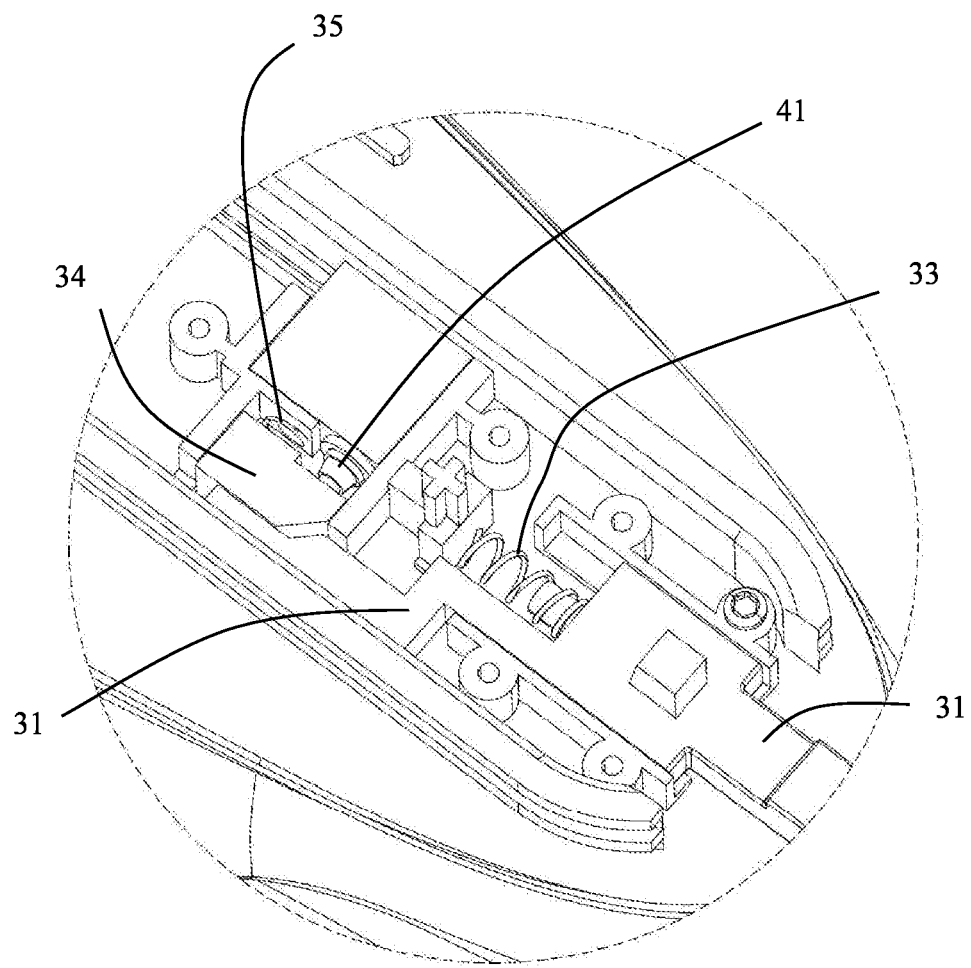
FIG. 5 is a partial enlarged view of FIG. 4.
Figure 6:
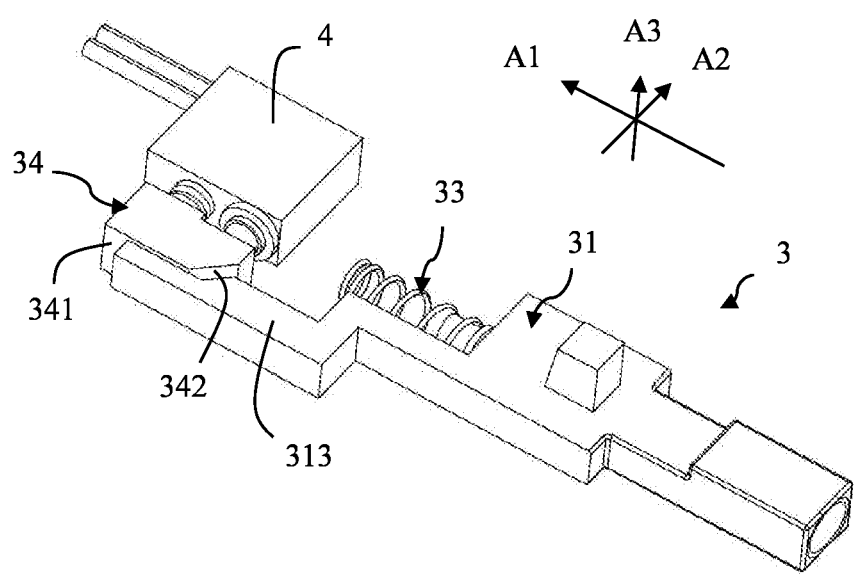
FIG. 6 is a structural schematic view of a mechanical lock at an angle in accordance with an embodiment of the present disclosure (a switch is also shown)
Figure 20:
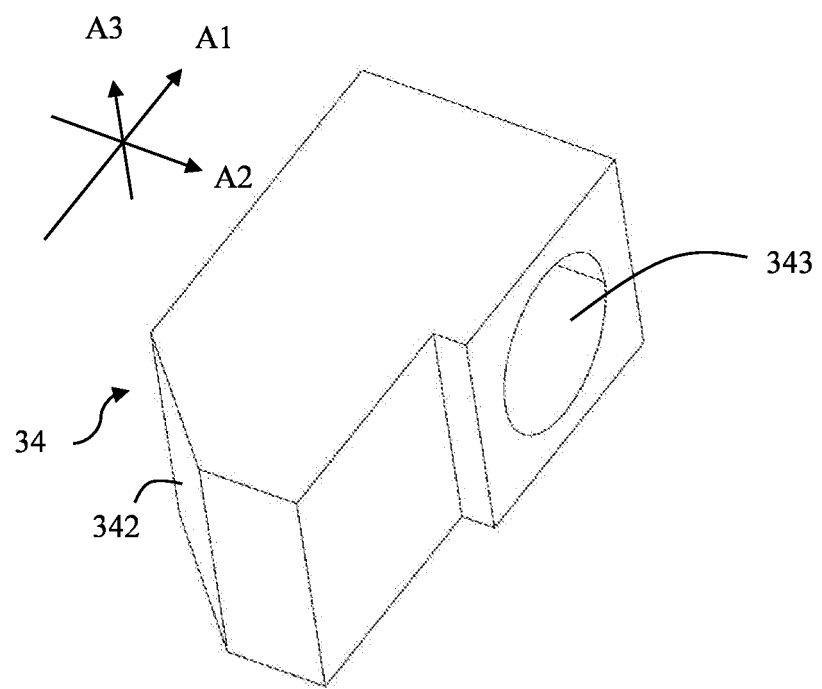
FIG. 20 is a schematic structural view of a slider.

Referring to FIG. 6, FIG. 7 and FIG. 20, the mechanical lock 3 further includes a slider 34. The slider 34 is provided in the housing 1 so as to slide along the left-right direction. Viewed along the left-right direction (for example, the direction A2), one side of the slider 34 has a third working surface 341 and a second guide surface 342. The third working surface 341 and the second guide surface 342 face the switch linkage portion 313. The second guide surface 342 is an inclined surface having the same inclination angle as the first guide surface 3133. Another side of the slider 34 has a groove 343. One end of the second elastic member 35 is accommodated in the groove 343, and the other end of the second elastic member 35 abuts against the housing 1, see FIG. 5. The second elastic member is a spring in the illustrated embodiment. Under the elastic force of the second elastic member 35, the slider 34 abuts against the push rod 31 to the left. The switch button 41 of the switch 4 faces the another side of the slider 34. The switch 4 is used to control the on-off of the current in the charging connector, so as to control the on-off of the charging connector for charging the electric vehicle.

Referring mainly to FIG. 8 to FIG. 15, when the hook portion 322 is at the unlocking position α, the first working surface 3131 abuts against the third working surface 341. The another side of the slider 34 is in the position of not touching or just touching the switch button 41, the switch button 41 is not pressed, and the switch 4 is in an off state. At this time, the charging connector cannot charge the electric vehicle, the hook 2 is in an unlocked state, and the operating portion 22 can be pressed.

When charging is required, an operator presses the operating portion 22 of the hook 2, the engaging portion 21 is tilted upwardly, the operator puts the charging connector to a mating port of the mating connector, releases the operating portion 22, and the engaging portion 21 is engaged at the mating port of the mating connector. Of course, in some embodiments, the operator may directly push the charging connector into the mating port of the mating connector without pressing the operating portion 22, so that the engaging portion 21 is engaged at the mating port of the mating connector.

Subsequently, the operator pushes the push rod 31, and the swing lever 32 moves from the unlocking position α to the locking position β along the locking guide slot. During this process, the slider 34 moves to the right under the guidance of the first guide surface 3133 and remains in a state where its third working surface 341 abuts against the second working surface 3132 of the switch linkage portion 313, see FIG. 10 to FIG. 13.

The slider 34 moves to the right and presses the switch button 41, so that the switch 4 is turned on, and the charging pile charges the electric vehicle through the charging connector. At this moment, the locking protrusion 3112 abuts against the operating portion 22, and the operating portion 22 cannot be pressed downwardly. The hook 2 will always be in the state of being locked at the mating port of the mating connector, thereby avoiding disconnection of the load of the charging connector.

After charging is completed, the operator pushes the push rod 31 again. The swing lever 32 moves from the locking position β to the unlocking position α along the unlocking guide slot. The slider 34 moves to the left under the guidance of the first guide surface 3133 and remains in a state where its third working surface 341 abuts against the first working surface 3131 of the switch linkage portion 313, see FIG. 14, FIG. 15, FIG. 8 and FIG. 9.

At this time, the switch 4 is in the off state again. Then the operator presses the operating portion 22 to make the engaging portion 21 pop out, and then disconnect the connection state of the charging connector and the mating connector.

In the illustrated embodiment, the slider 34 has a second guide surface 342, and the second guide surface 342 is an inclined surface having the same inclination angle as the first guide surface 3133. Such an arrangement makes the movement of the slider 34 smoother. In some embodiments of the present disclosure, the slider 34 may not be provided with the second guide surface 342. Alternatively, in some embodiments of the present disclosure, the second guide surface 342 can be integrated with the third working surface 341. For example, the second guide surface 342 and the third working surface 341 are set as an arc surface.

The charging connector 100 disclosed in the present disclosure will continue to be introduced as follows with reference to the accompanying drawings.

Figure 26:
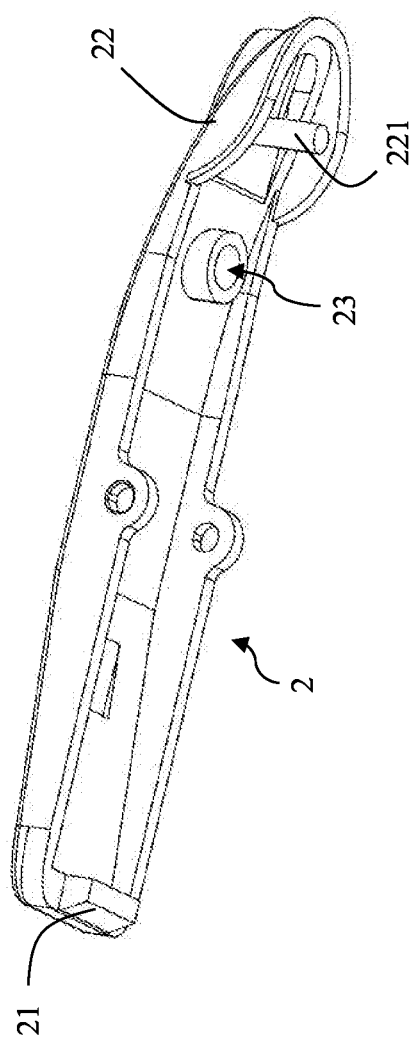
FIG. 26 is a schematic structural view of a hook.

Referring to FIG. 2 and FIG. 26, the housing 1 includes an upper housing 11 and a lower housing 12. The middle portion of the hook 2 is pivotally supported on the upper housing 11. A protrusion 221 is provided on the lower side of the operating portion 22. When the mechanical lock 3 is in the locked state, the locking protrusion 3112 abuts against the protrusion 221.

A spring hole 23 is further provided on a side of the hook 2 adjacent to the operating portion 22, and a spring post 121 is correspondingly provided on the lower housing 12. One end of the third elastic member 7, which is a spring in the illustrated embodiment, is accommodated in the spring hole 23, and the other end is sleeved on the spring post 121. The third elastic member 7 is always in a compressed state. Therefore, under the condition of no external force, the operating portion 22 of the hook 2 will be kept at a raised position under the elastic force of the third elastic member 7. Only when an external force is applied to the operating portion 22, the operating portion 22 will move downwardly.

The mechanical lock 3 is located between the upper case 11 and the lower case 12.

Figure 3:
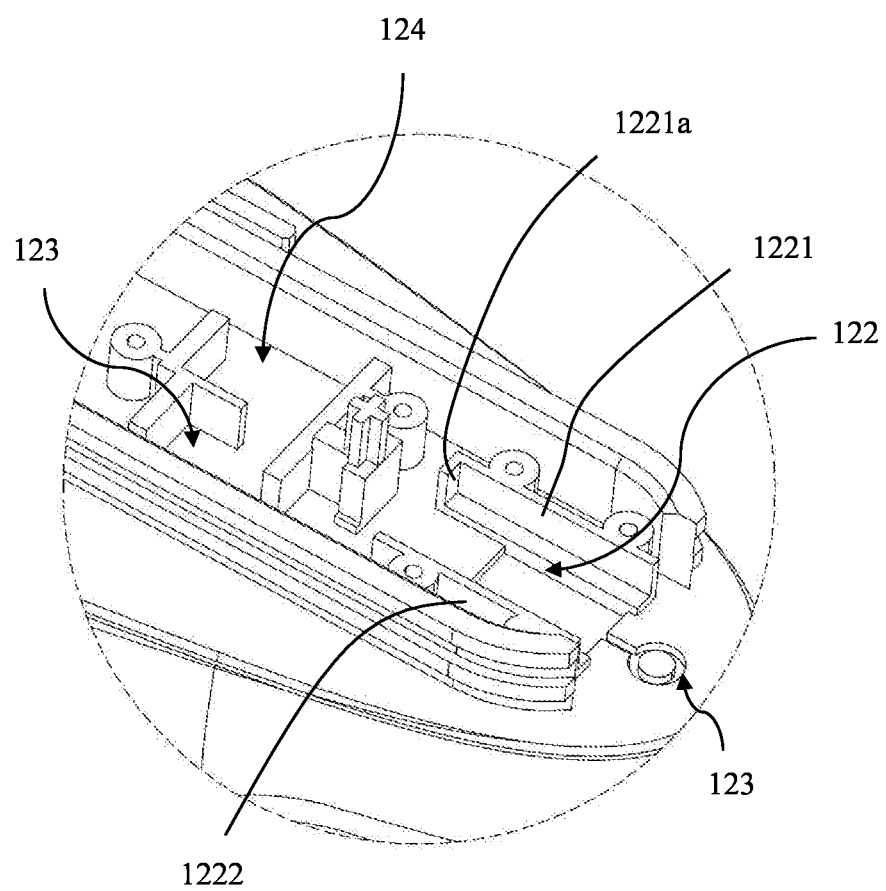
FIG. 3 is a partial enlarged view of FIG. 2.

Referring to FIGS. 3 and 5, the lower case 12 has a first guide groove 122. The first guide groove 122 is at least defined by a first guide plate 1221 and a second guide plate 1222 fixed to the lower housing 12.

The first guide plate 1221 and the second guide plate 1222 are opposite to each other. Part of the push rod 31 is accommodated in the first guide groove 122. The left and right sides of the push rod 31 approach or abut against the first guide plate 1221 and the second guide plate 1222, respectively, so that the movement of the push rod 31 in the left-right direction is restricted. The push rod 31 can move relative to the first guide plate 1221 and the second guide plate 1222 along the front-back direction (for example, the direction A1).

One end of the first guide plate 1221 has a baffle 1221a. When the push rod 31 moves forwardly to a maximum distance, the baffle 1221a approaches or abuts against the push rod body 311 of the push rod 31.

The lower housing 12 also has a second guide groove 123 and a positioning groove 124. The second guide groove 123 is adjacent to the positioning groove 124. The switch 4 is accommodated in the positioning groove 124 and the switch button 41 is exposed to the second guide groove 123. The slider 34 is slidably disposed in the second guide groove 123 along the left-right direction. One end of the second elastic member 35 abuts against the slider 34, and the other end of the second elastic member 35 abuts against a partition plate between the second guide groove 123 and the positioning groove 124.

In the illustrated embodiment, the first guide groove 122, the second guide groove 123 and the positioning groove 124 are integrally formed with the lower housing 12.

Figure 21:
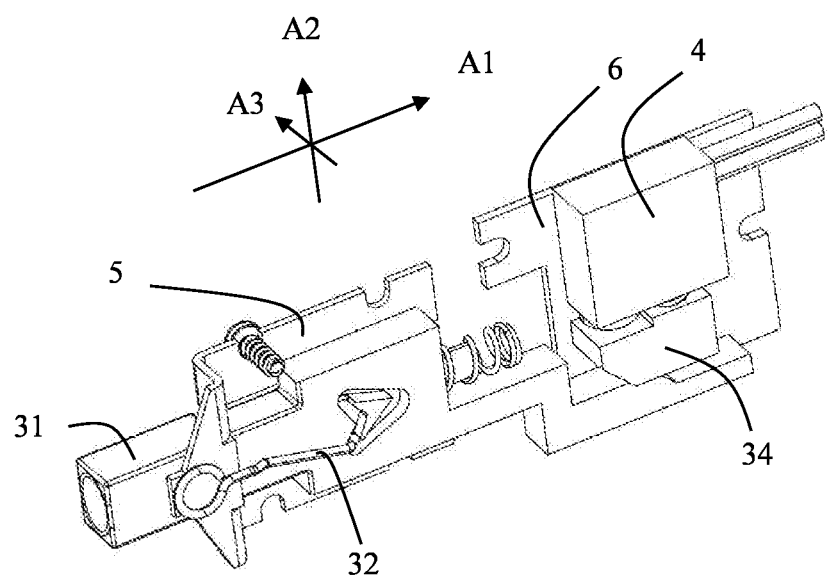
FIG. 21 is a perspective view of the mechanical lock, a first cover plate, a second cover plate, the first elastic member and a switch.
Figure 22:
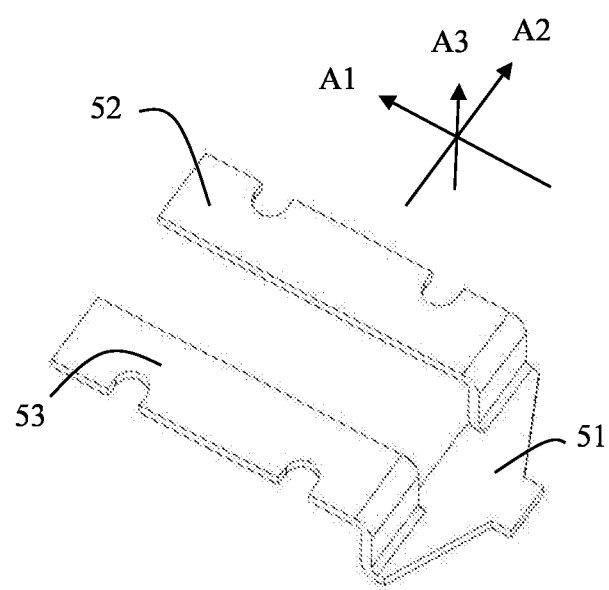
FIG. 22 is a schematic structural view of the first cover plate.
Figure 23:
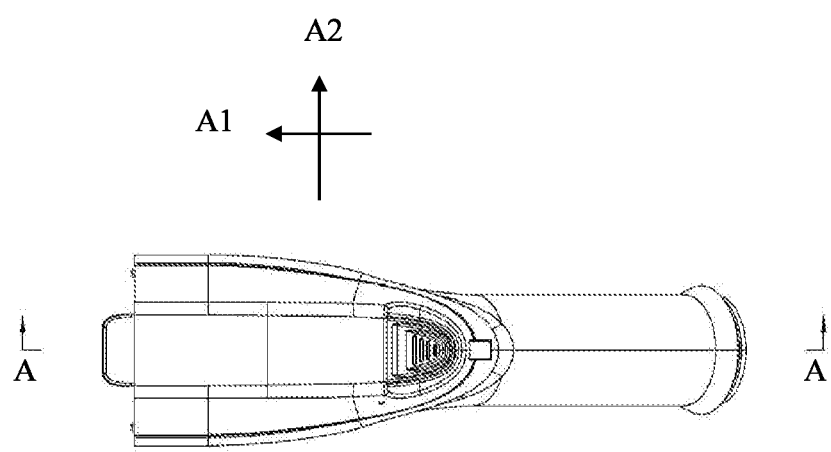
FIG. 23 is a schematic top view of the charging connector in accordance with an embodiment of the present disclosure, viewed from a left side of the charging connector.

The charging connector 100 also includes a first cover plate 5. Referring mainly to FIGS. 21 and 22, the first cover plate 5 has a body portion 51, a first arm portion 52 and a second arm portion 53. The first arm portion 52 and the second arm portion 53 extend side by side on one side of the body portion 51, and both the first arm portion 52 and the second arm portion 53 extend upwardly relative to the body portion 51 for a certain distance.

The first arm portion 52 is fixed on an upper side of the first guide plate 1221, and the second arm portion 53 is fixed on an upper side of the second guide plate 1222, thereby limiting the degree of freedom of the push rod 31 in the top-bottom direction.

One end of the push rod 31 extends beyond the housing 1 from a place between the first arm portion 52 and the second arm portion 53. The body portion 51 is located on the lower side of the push rod 31.

The lower housing 12 also has an annular groove 123, as shown in FIG. 3. The annular handle 321 of the swing lever 32 is accommodated in the annular groove 123. The body portion 51 of the first cover plate 5 presses and covers an upper side of the annular groove 123, and further holds the annular handle 321 of the swing lever 32 on the housing 1.

The charging connector 100 also includes a second cover plate 6. The second cover plate 6 is fixed on an upper side of the second guide groove 123 and the positioning groove 124, so as to cover the slider 34 and the switch 4 in the second guide groove 123 and the positioning groove 124, thereby restricting the degree of freedom of the slider 34 and the switch 4 in the top-to-bottom direction.

It should be understandable that there is a charging element in the charging connector 100, which is known to those of ordinary skill in the art, so that details will not be described here.

In the illustrated embodiment, by misaligning the heart-shaped cam 3113 and the heart-shaped groove 3114, the hook portion 322 located at the tip, the first corner, the recess and the second corner of the heart-shaped groove 3114 can smoothly move clockwise relative to the push rod 31 (see FIG. 19). In addition, because at the second corner, the swing lever 32 has a tendency to move to the left and return to the third groove section 3114"a under the influence of its own elastic recovery force, in order to better ensure that the hook portion 322 enters the fourth groove section 3114"b from the third groove section 3114"a, the step 3114e is provided at the exit of the third groove section 3114"a in the illustrated embodiment. The step 3114e will guide the hook portion 322 that enters the fourth groove section 3114"b to move into the fourth groove section 3114"b.

This present disclosure effectively utilizes the restoring force of the swing lever 32 itself and the shape of the heart-shaped cam 3113, so that the setting of the heart-shaped groove 3114 is relatively simple (only one step 3114e is provided).

In an embodiment of the present disclosure, by utilizing the shape of the heart-shaped cam 3113, no step 3114e may be provided at the second corner. Compared with a situation where the step 3114e is not provided, the certainty of the sequential movement of the swing lever 32 provided with the step 3114e is improved.

In other embodiments of the present disclosure, steps can also be set at multiple locations, such as the entrance and exit of the first groove section 3114'a, and the exit of the second groove section 3114'b, so as to ensure that the hook portion 322 can move in sequence.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A mechanical lock configured to be used in a charging connector; the charging connector comprising a housing and a hook; the hook comprising an engaging portion and an operating portion; the engaging portion being engaged or disengaged with a mating connector when the operating portion is moved by an external force; the mechanical lock comprising a push rod, a swing lever and a first elastic member;

wherein the first elastic member is configured to be able to provide the push rod with a force opposite to a direction of the external force which is applied to the push rod;

the push rod is slidably arranged on the housing along a first direction; the push rod has a heart-shaped cam and a heart-shaped groove; the heart-shaped groove surrounds a peripheral of the heart-shaped cam;

one end of the swing lever is fixed to the housing, and another end of the swing lever is located in the heart-shaped groove;

the heart-shaped groove has an unlocking position and a locking position;

when the another end of the swing lever is located at the locking position, the operating portion is locked by the push rod, and the operating portion cannot move; and when the another end of the swing lever is located at the unlocking position, the push rod unlocks the operating portion, and the operating portion is movable.

2. The mechanical lock according to claim 1, wherein the heart-shaped groove comprises a first groove section, a second groove section, a third groove section and a fourth groove section;

a junction of the fourth groove section and the first groove section is a tip of the heart-shaped groove, and the unlocking position is located at the tip;

a junction of the second groove section and the third groove section is a recess of the heart-shaped groove, and the locking position is located in the recess;

the heart-shaped cam comprises a first cam surface, a second cam surface, a third cam surface and a fourth cam surface;

the heart-shaped groove comprises a first groove wall, a second groove wall, a third groove wall and a fourth groove wall;

the first groove section is at least surrounded by the first cam surface and the first groove wall opposite to each other; the second groove section is at least surrounded by the second cam surface and the second groove wall opposite to each other; the third groove section is at least surrounded by the third cam surface and the third groove wall opposite to each other; the fourth groove section is at least surrounded by the fourth cam surface and the fourth groove wall opposite to each other;

the first cam surface is configured to guide the another end of the swing lever located at the unlocking position to the first groove section when the push rod moves;

the second cam surface is configured to guide the another end of the swing lever located at an entrance of the second groove section to the locking position when the push rod moves; and the third groove wall is configured to guide the another end of the swing lever located at the locking position to the third groove section when the push rod moves.

3. The mechanical lock according to claim 2, wherein a groove bottom of the heart-shaped groove is an angled slope, and the groove bottom is provided with a step;

the step is located at an exit of the third groove section, and the step is configured to prevent the another end of the swing lever entering the fourth groove section from returning to the third groove section.

4. The mechanical lock according to claim 1, wherein the push rod has a locking protrusion;

when the another end of the swing lever is located at the locking position, the locking protrusion abuts against the operating portion; and when the another end of the swing lever is located at the unlocking position, the locking protrusion is misaligned with the operating portion.

5. The mechanical lock according to claim 1, wherein the swing lever comprises a rod;

the rod extends between the one end of the swing lever and the another end of the swing lever; and viewed from a side of the push rod with the heart-shaped cam, a central line of the rod is collinear with a line connecting the unlocking position and the locking position.

6. The mechanical lock according to claim 5, wherein the another end of the swing lever is a hook portion which is perpendicular to the rod; and the one end of the swing lever is an annular handle which is fastened to the housing.

7. The mechanical lock according to claim 1, wherein the push rod has a switch linkage portion, and the switch linkage portion is capable of being linked with a switch so as to turn on and off the switch.

8. The mechanical lock according to claim 7, wherein the switch linkage portion comprises a first working surface, a second working surface, and a first guide surface extending between the first working surface and the second working surface;

the mechanical lock further comprises a slider which is slidably arranged on the housing; one side of the slider abuts against the switch linkage portion, and the another side of the slider faces the switch;

when the another end of the swing lever is located at the unlocking position, the one side of the slider abuts against the first working surface, and the another side of the slider does not press the switch; and when the another end of the swing lever is at the locking position, the one side of the slider abuts against the second working surface, and the another side of the slider presses the switch.

9. The mechanical lock according to claim 7, wherein the first guide surface is an inclined surface;

the slider has a second guide surface, and the second guide surface is an inclined surface matching a shape of the first guide surface.

10. The mechanical lock according to claim 1, wherein the push rod has a bent portion, and the bent portion has a first surface;

when the push rod moves into the housing to a maximum displacement, the first surface approaches or abuts against the housing.

11. A charging connector, comprising: a housing, a hook and a mechanical lock;

wherein the hook comprises an engaging portion and an operating portion; the engaging portion is engaged or disengaged with a mating connector when the operating portion is moved by an external force;

the mechanical lock is configured to lock or unlock the operating portion, so that the operating portion is in a movable state or an immovable state;

the mechanical lock comprises: a push rod, a swing lever and a first elastic member;

the first elastic member is configured to be able to provide the push rod with a force opposite to a direction of the external force which is applied to the push rod;

the push rod is slidably arranged on the housing along a first direction; the push rod has a heart-shaped cam and a heart-shaped groove; the heart-shaped groove surrounds a peripheral of the heart-shaped cam;

one end of the swing lever is fixed to the housing, and another end of the swing lever is located in the heart-shaped groove;

the heart-shaped groove has an unlocking position and a locking position;

when the another end of the swing lever is located at the locking position, the operating portion is locked by the push rod, and the operating portion cannot move; and when the another end of the swing lever is located at the unlocking position, the push rod unlocks the operating portion, and the operating portion is movable.

12. The charging connector according to claim 11, the heart-shaped groove comprises a first groove section, a second groove section, a third groove section and a fourth groove section;

a junction of the fourth groove section and the first groove section is a tip of the heart-shaped groove, and the unlocking position is located at the tip;

a junction of the second groove section and the third groove section is a recess of the heart-shaped groove, and the locking position is located in the recess;

the heart-shaped cam comprises a first cam surface, a second cam surface, a third cam surface and a fourth cam surface;

the heart-shaped groove comprises a first groove wall, a second groove wall, a third groove wall and a fourth groove wall;

the first groove section is at least surrounded by the first cam surface and the first groove wall opposite to each other; the second groove section is at least surrounded by the second cam surface and the second groove wall opposite to each other; the third groove section is at least surrounded by the third cam surface and the third groove wall opposite to each other; the fourth groove section is at least surrounded by the fourth cam surface and the fourth groove wall opposite to each other;

the first cam surface is configured to guide the another end of the swing lever located at the unlocking position to the first groove section when the push rod moves;

the second cam surface is configured to guide the another end of the swing lever located at an entrance of the second groove section to the locking position when the push rod moves; and the third groove wall is configured to guide the another end of the swing lever located at the locking position to the third groove section when the push rod moves.

13. The charging connector according to claim 12, wherein a groove bottom of the heart-shaped groove is an angled slope, and the groove bottom is provided with a step;

the step is located at an exit of the third groove section, and the step is configured to prevent the another end of the swing lever entering the fourth groove section from returning to the third groove section.

14. The charging connector according to claim 11, wherein the push rod has a locking protrusion;

when the another end of the swing lever is located at the locking position, the locking protrusion abuts against the operating portion; and when the another end of the swing lever is located at the unlocking position, the locking protrusion is misaligned with the operating portion.

15. The charging connector according to claim 11, wherein the swing lever comprises a rod;

the rod extends between the one end of the swing lever and the another end of the swing lever; and viewed from a side of the push rod with the heart-shaped cam, a central line of the rod is collinear with a line connecting the unlocking position and the locking position.

16. The charging connector according to claim 15, wherein the another end of the swing lever is a hook portion which is perpendicular to the rod; and the one end of the swing lever is an annular handle which is fastened to the housing.

17. The charging connector according to claim 11, wherein the push rod has a switch linkage portion, and the switch linkage portion is capable of being linked with a switch so as to turn on and off the switch.

18. The charging connector according to claim 17, wherein the switch linkage portion comprises a first working surface, a second working surface, and a first guide surface extending between the first working surface and the second working surface;

the mechanical lock further comprises a slider which is slidably arranged on the housing; one side of the slider abuts against the switch linkage portion, and the another side of the slider faces the switch;

when the another end of the swing lever is located at the unlocking position, the one side of the slider abuts against the first working surface, and the another side of the slider does not press the switch; and when the another end of the swing lever is at the locking position, the one side of the slider abuts against the second working surface, and the another side of the slider presses the switch.

19. The charging connector according to claim 17, wherein the first guide surface is an inclined surface;

the slider has a second guide surface, and the second guide surface is an inclined surface matching a shape of the first guide surface.

20. The charging connector according to claim 11, wherein the push rod has a bent portion, and the bent portion has a first surface;

when the push rod moves into the housing to a maximum displacement, the first surface approaches or abuts against the housing.

* * * * *